Patented May 1, 1928.

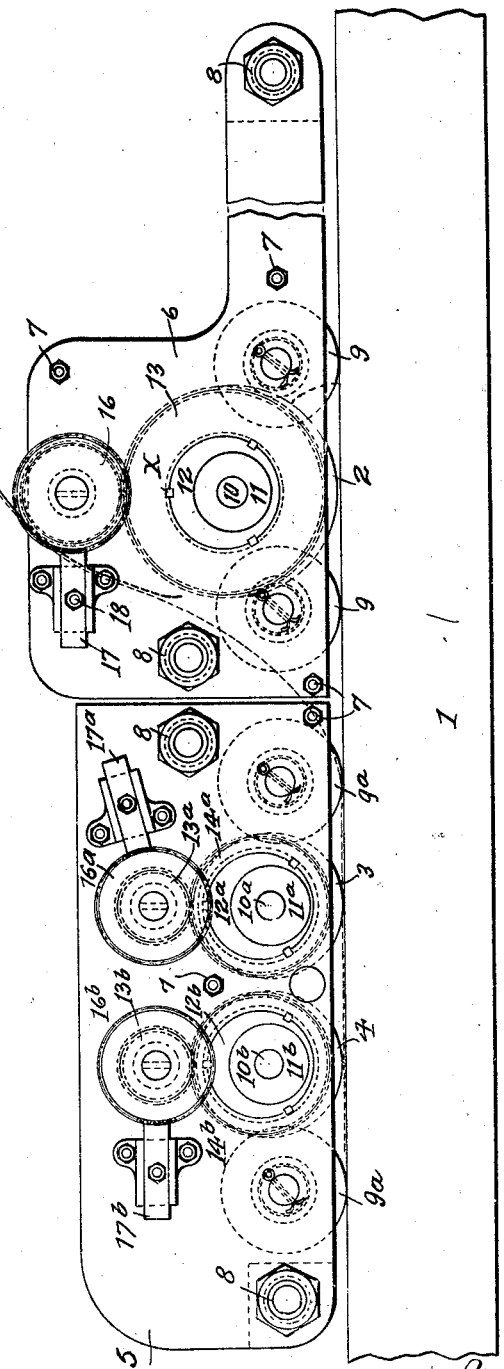

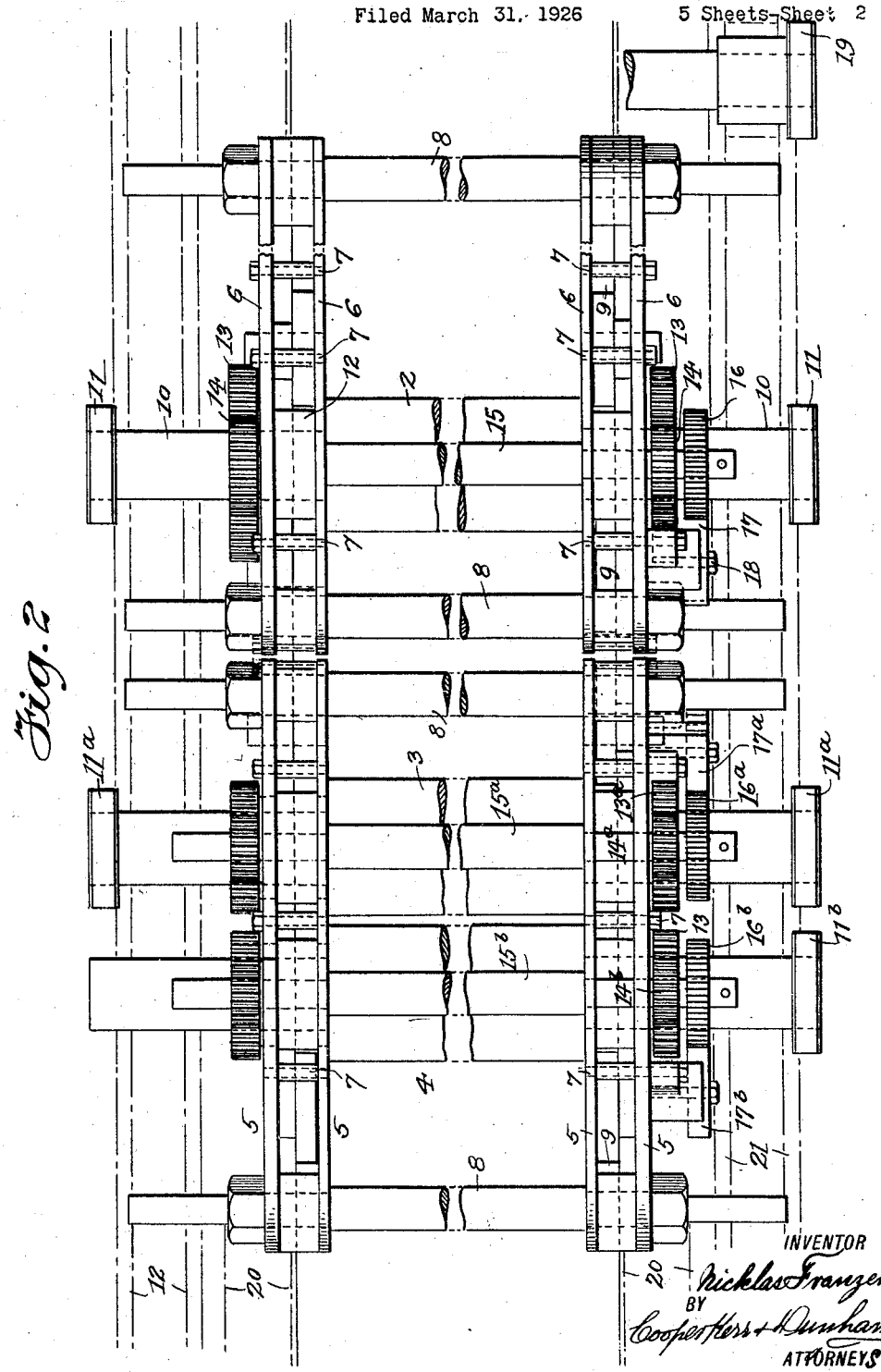

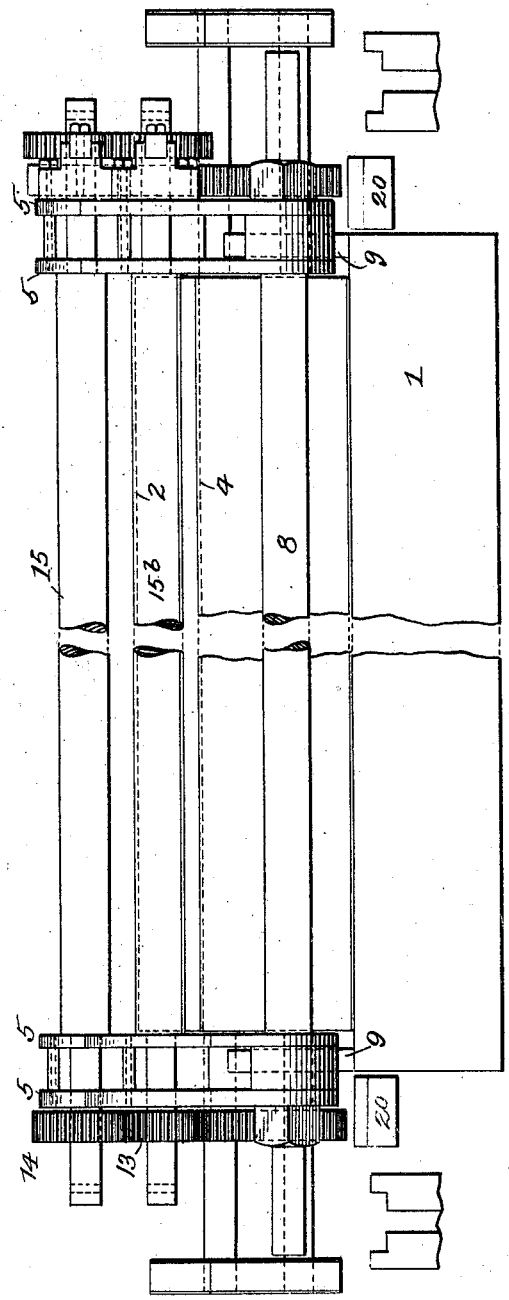

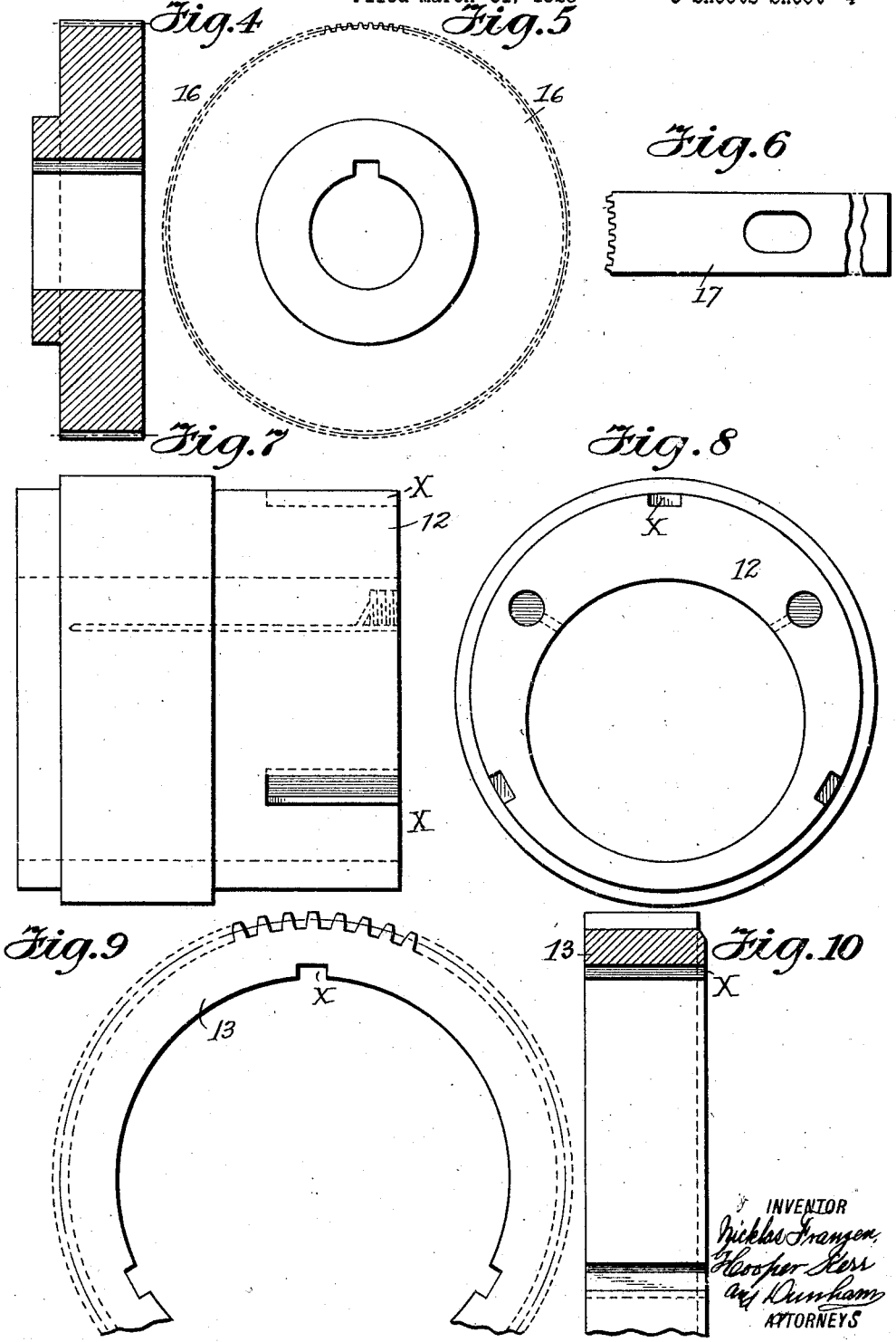

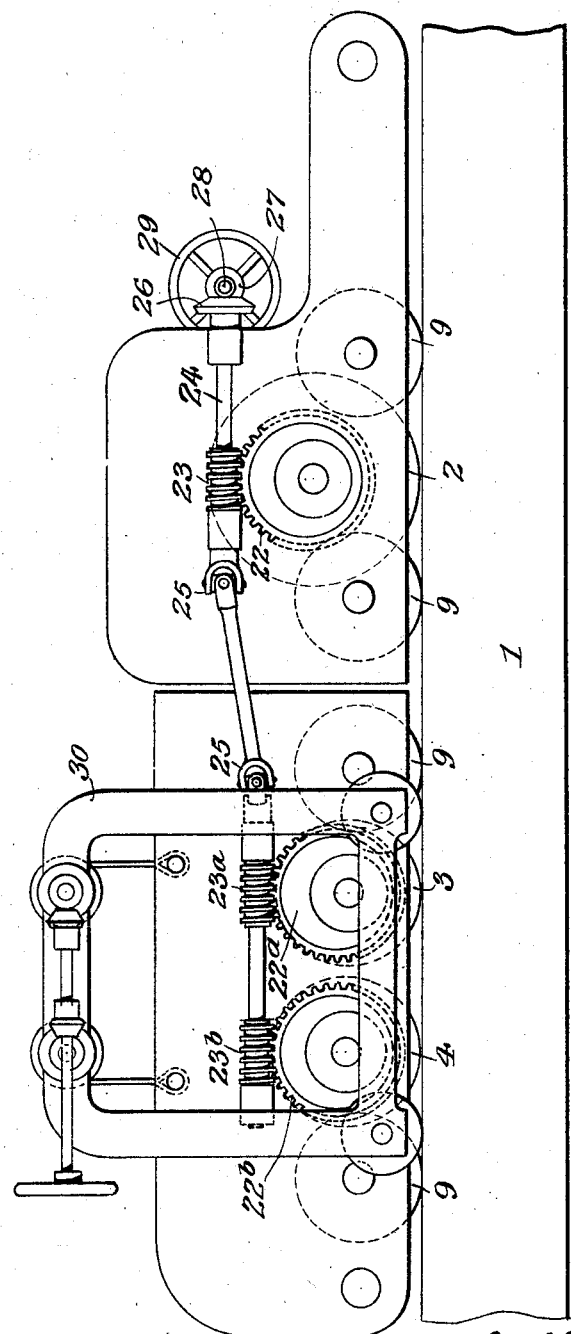

1,668,200

UNITED STATES PATENT OFFICE.

NICKLAS FRANZEN, OF LONG BEACH, CALIFORNIA.

GLASSWORKING MACHINE.

Application filed March 31, 1926. Serial No. 98,672.

This invention relates to the art of working plastic materials and particularly to the manufacture of sheet-glass, either plain glass or wire glass, and has for its object the provision of an improved apparatus for continuously or intermittently forming molten glass in sheet form in a rapid, efficient, and economical manner, and further, it has for its object the provision of a new and novel adjusting mechanism for varying the distance between a roll or rolls and the support for the plastic material as in sheet-glass forming machines for regulating and maintaining the desired thickness of the glass-sheet being formed; and for changing the thickness of the glass sheet without interrupting the operation of the apparatus while the glass sheet is passing through the machine; and further, the provision in such a machine of a unit control mechanism for setting and changing a multiplicity of rolls simultaneously.

I have illustrated my invention in the accompanying drawings in which

Fig. 1 is a side elevation of my new sheet-glass forming machine;

Fig. 2 is a plan view thereof;

Fig. 3 is an end elevation of the machine;

Figs. 4–10 are detail views of the adjusting mechanism; and

Fig. 11 is a side elevation of a machine with unitary control for adjusting the rolls thereof.

In the drawings, 1 is a table on which molten glass is placed to be formed into sheet-glass. Above the table 1 a forming roll 2, a wire setting roll 3, and a finishing roll 4, together with eccentric mechanism for regulating the position of said rolls, which mechanism will be hereinafter described in detail, are all mounted on a suitable carriage consisting of eight upright plates 5, 5, 5, 5, and 6, 6, 6, 6. Four of the plates 5, 5, and 6, 6, are mounted on one side of the table 1 and the other four plates 5, 5, and 6, 6, are mounted on the other side of said table, the four sets being secured together, two and two in parallel, with an intervening space between them by separators and bolts, as indicated at 7, 7, 7. The four sets of upright plates 5, 5, and 6, 6, are further joined together by bolted separator shafts shown at 8, 8, 8, 8, extending across the table 1 and the whole carriage mechanism is mounted on eight rollers 9, 9, four on each side of the carriage and traveling, respectively, on the opposite edges of the table 1.

The roll 2 is provided with trunnions, 10, 10, one on each side thereof, which pass through the side-walls 6, 6, of the carriage and on the ends of said trunnions are gears 11, 11, for engagement with the source of power such as a link belt silent chain (not shown). Eccentric sleeve bearings, 12, 12, are provided, one for each of said trunnions, as they pass through the side-walls, and the said eccentric sleeves are mounted in close fitting holes in the side-walls 6, 6. It will be apparent, from the construction just described, that a movement of the eccentric sleeves 12, 12, in unison will raise or lower the trunnions 10, 10, and vary the distance between the forming roll and the table 1. In order that the desired adjustment may be made effectively, I have provided gear mechanism for turning the eccentric sleeves and suitable locking mechanism for maintaining the whole apparatus at the desired point of adjustment. To this end, ring gears 13, 13 are keyed as indicated at X to the outer edge and surface of the eccentrics 12, 12, and the teeth of the said gears 13, 13, mesh with the teeth of two gears, 14, 14, keyed on opposite ends of a shaft 15. A calibrated dial and lock gear 16 is mounted on the end of the shaft 15 and a lock bar 17 engages the teeth of said gear 16 and is held in locked position by a bolt 18. The roll 3 has suitable wire setting ridges on its outer face and the rolls 3 and 4 are provided with supporting and adjustment mechanism similar to that described in connection with the roll 2. A suitable source of power for driving the rolls 2, 3 and 4 is indicated at 19 and connected to the gear 11, 11$^a$, 11$^b$, by a link belt chain (not shown).

In operation, when it is desired to set the roll 2 a suitable distance from the table 1 to produce a glass sheet of desired thickness, the dial gear 16 is turned to the corresponding calibrated measurement thereon, the rotation of the said gear 16 causing the rotation of the gears 14, 14, mounted on the shaft 15, which in turn cause the rotation of the gears 13, 13, and the latter, being keyed to the eccentrics 12, 12, cause said eccentrics to turn in unison about the trunnions 10, 10, thereby raising or lowering the forming roll the distance from the table 1 indicated on the calibrated dial 16. The lock bar 17 is then brought forward until the teeth thereon engage the teeth on the gear 16 in line with the end of said bar, and the bolt 18 screwed home thus locking the mechanism in the desired position.

The wire setting roll 3 is adjusted by turning the dial gear 16$^a$ which movement is transmitted to the eccentric 12$^a$ through the gears 13$^a$ and 14$^a$, and in this instance, the adjustment is such that the wire setting ridges on the roll 3 will set the wire the required distance into the glass sheet. The finishing roll 4 is set by turning dial gear 16$^b$, the gears 14$^b$, 13$^b$ and the eccentric sleeve 12$^b$ in the manner described in connection with rolls 2 and 3, the roll 4 being adjusted to give the desired thickness in the finished sheet.

With the rolls 2, 3 and 4 all adjusted in position and rotating, the table 1 is drawn back into position to the right of the sheet forming rolls shown in Figure 1, said table being driven backward and forward alternately by a rack and pinion mechanism conventionally indicated at 20 and the whole sheet forming structure is supported on stanchions 21, 21, and rests on table at wheels 9 when table is passing back and forward under machine. With the front of the table 1 in position to the right of the forming roll 2, the table is started toward the roll and the molten glass poured on the front end of the table. The table and the molten glass travel forward toward the roll 2 and the glass is flattened out in sheet form. The formed sheet then passes to the wire setting roll 3, the wire is fed to the top of the sheet and the ridges on said roll extending into the glass and setting the wire at the required distance therein, the glass displaced by the ridges being forced up into the grooves between successive ridges. After passing through the wire setting roll, the glass sheet passes under the finishing roll 4 which flattens out the glass ridges produced by the wire setting roll 3 and the finished sheet is passed on to a receiving mechanism therefor. The driving mechanism 20 is thereafter reversed, the table drawn back to the initial position, and the steps above described repeated.

While I have described my new machine in connection with the production of wire-glass, the manufacture of plain sheet glass can be carried on by the use of the forming roll 2 alone, in which case the wire setting roll 3 and the finishing roll 4 will be dispensed with; or be raised out of contact with the passing sheet; or the wire setting roll 3 is raised the required distance and the forming roll 2 and the finishing roll 4 are adjusted to form and finish a sheet of the required diameter; and, further, the said forming machine in any of the above described embodiments, is useful in connection with a continuously traveling table, such as a caterpillar structure or a roll, supplied from a continuous source of molten glass or from overlapping pourings, or the carriage mechanism may be driven along a stationary table of great length by connecting the driving rack and pinion 20 to the carriage, for the purpose described.

With a roll setting mechanism such as that above described, glass sheets of various thickness are produced, without interrupting the operation of the machine or of the process and while the glass sheet is passing through the machine, a change from one thickness to another being accomplished by unlocking the bar 17 in the case of plain glass and turning by hand the dial and lock gear 16 to the point indicating the thickness next desired, the turning of said gear 16 raises or lowers the roll 2 as above described. When wire glass is being made, similar adjustments are made on the rolls 2, 3 and 4 successively, but preferably simultaneously, as by three operators, one at each roll, to produce sheets continuously of various diameters or thicknesses. In this way waste incident to the changing of the thickness of the wire glass passing through the machine is reduced to a minimum.

In the apparatus shown in Fig. 11 the adjustment of the eccentrics of rolls 2, 3 and 4 is accomplished simultaneously by one operator by means of a unit control mechanism for initially setting the machine or for changing from one thickness to another while the glass sheet is passing through the machine. In this structure worm gear 22, 22$^a$ and 22$^b$ are keyed to the eccentric sleeves 12, 12$^a$ and 12$^b$ of the respective rolls 2, 3 and 4 on each side of the machine, and worms, 23, 23$^a$ and 23$^b$ are provided for the worm gears 22, 22$^a$ and 22$^b$. The worms 23, 23$^a$ and 23$^b$ on each side of the machine are mounted on shafts 24, 24, provided with universal joints, 25, 25, and the two shafts 24 are connected through gears 26 and 27 and cross shaft, 28. It follows, then, that a movement of one shaft 24 as by the rotation of a wheel, 29, causes all the aforementioned interconnected shafts and gears, worms, worm gears and cross shafts to cooperate to move in unison all the eccentric sleeves 12, 12$^a$ and 12$^b$ on both sides of the machine and raise or lower the rolls 2, 3 and 4 simultaneously the desired distance from the table 1. It will be understood that the eccentric sleeves 12$^a$ of the wire setting roll 3 have a throw in adjustment of only half that of the eccentric sleeves 12 and 12$^b$ of the rolls 2 and 4 and hence the wire netting is maintained in the center of the glass sheet of any thickness to which the machine is adjusted. A crane 30 is provided for lifting and lowering the carriage containing the rolls 3 and 4 out of and into operative relation with the glass sheet passing through the machine when it is desired to change over from wire glass to plain glass and vice versa in either type of machine shown in the drawings. The crane 30 is particularly useful in connection with the type of machine shown in Figure 11, where the rolls 2, 3 and 4 are linked together through the unitary control mechanism, as the calibrated relation of the rolls to each other is maintained at all times. Thus, with the rolls 3 and 4 raised by the crane 30 out of contact with the glass sheet, the thickness of the plain glass sheet being made by the roll 2 may be changed a number of times, the rolls 3 and 4 being adjusted each time through the mechanism actuated by the wheel 29, or a dial gear, and when it is desired to change over to wire glass, it is only necessary to start to feed the wire netting to the glass sheet and lower the rolls 3 and 4 to the position of rest on the table 1.

What I claim is:

1. In a glass forming machine, the combination of a suitable support for plastic material, a plurality of rolls in operative relation to said support, and means for adjusting the relative positions of said rolls and said support simultaneously.

2. In a glass working machine, the combination of a suitable support for molten glass, a forming roll and wire working rolls in operative relation to said molten glass, means for adjusting the rolls simultaneously, and means for raising and lowering the wire working rolls out of and into contact with the glass.

3. The method of forming sheet glass which consists in passing molten glass through a forming and working mechanism presenting to the glass a series of openings to produce a sheet of one thickness and moving simultaneously the forming and working mechanism to present openings of another thickness while the glass is being passed through the forming and working mechanism.

4. In a glass forming machine, the combination of a suitable support for plastic material, a plurality of rolls in operative relation to said support, and means for simultaneously varying the relative positions of said rolls and said support while the plastic material is passing through the machine.

5. In a glass working machine, the combination of a suitable support for molten glass, a roll having trunnions and in operative relation to said molten glass and said support, eccentric sleeves around said trunnions, and means for moving said eccentric sleeves in unison.

6. In a glass working machine, the combination of a suitable support for molten glass, of a roll in operative relation to said molten glass and said support, of eccentric sleeve bearings for said roll, and a train of gears for moving said sleeves in unison.

7. In a glass working machine, the combination of a suitable support for the molten glass, a roll having trunnions and in operative relation to said molten glass and said support, eccentric sleeves around said trunnions, means for moving said eccentric sleeves in unison, and means for locking said moving means.

8. In a glass working machine, the combination of a suitable support for molten glass, a roll in operative relation to said molten glass and said support, eccentric sleeve bearings for said roll, and a train of gears for moving said sleeves in unison and means for locking said gears.

In testimony whereof I hereto affix my signature.

NICKLAS FRANZEN.